W. KIESER.
ROTOR FOR ELASTIC FLUID TURBINES.
APPLICATION FILED JUNE 27, 1914.
1,107,238.
Patented Aug. 11, 1914.
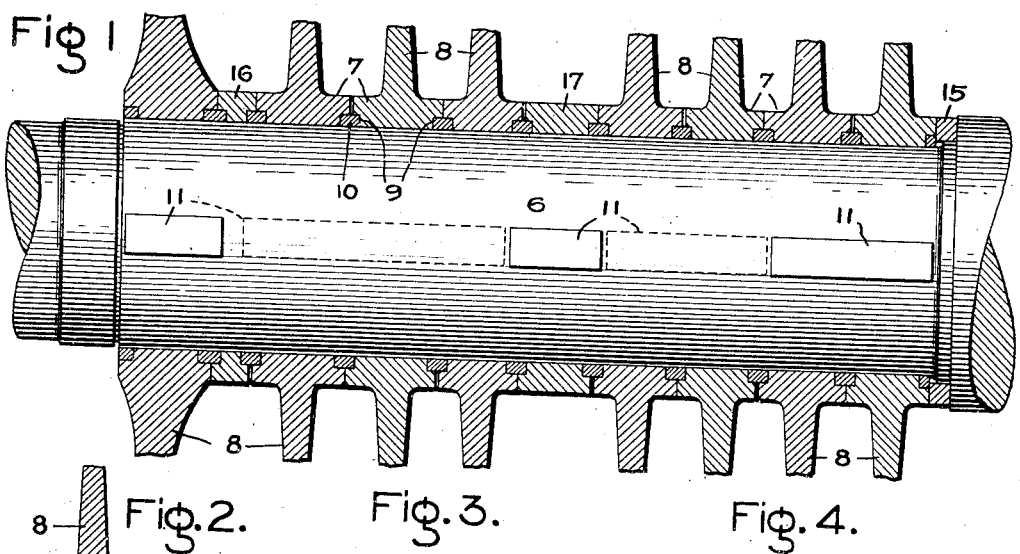
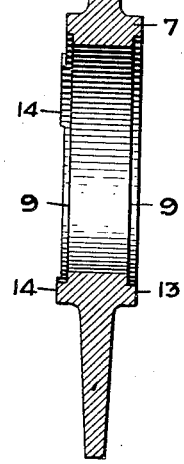
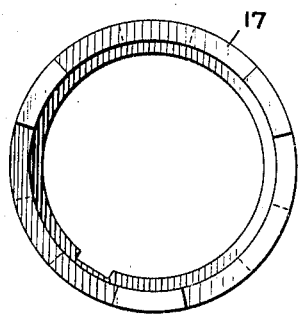
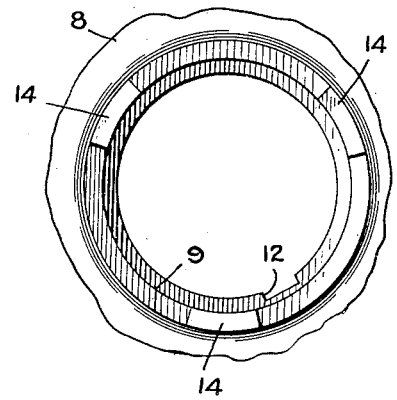
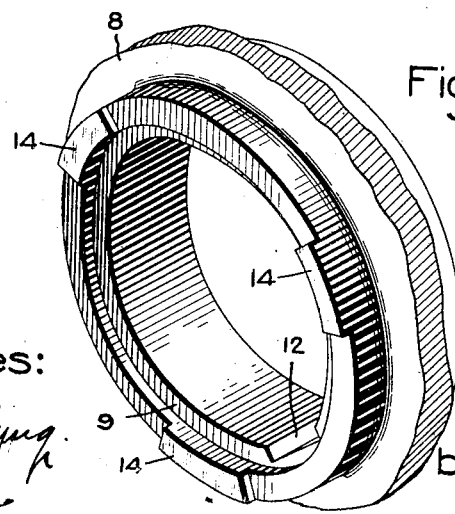
Witnesses:
Marcus L. Byng
J. Ellis Glen
Inventor,
Walter Kieser,
by Albert G. Davis
Att'y.

UNITED STATES PATENT OFFICE.

WALTER KIESER, OF CHARLOTTENBURG, GERMANY, ASSIGNOR TO GENERAL ELECTRIC COMPANY, A CORPORATION OF NEW YORK.

ROTOR FOR ELASTIC-FLUID TURBINES.

1,107,238.

Specification of Letters Patent.

Patented Aug. 11, 1914.

Application filed June 27, 1914. Serial No. 847,714.

*To all whom it may concern:*

Be it known that I, WALTER KIESER, a citizen of the Swiss Republic, residing at Charlottenburg, Germany, have invented certain new and useful Improvements in Rotors for Elastic-Fluid Turbines, of which the following is a specification.

The present invention relates primarily to elastic fluid turbines and has for its object to improve the construction of the rotors thereof.

In operation, the rotor of a steam turbine is subjected to comparatively high temperatures and it sometimes happens that the parts are unevenly heated, the bucket carrying wheels being heated to a higher temperature than the shaft. This results in unequal axial expansion of the wheels relative to the shaft which, with ordinary known structures, results in excessive strains, and may result in serious deformations.

By my present invention I provide an improved construction wherein the wheel hubs are so attached to the shaft and mounted relatively to each other as to permit of a certain amount of unequal expansion, and to this end I so construct and arrange the wheel hubs that the same may yield relative to each other in a longitudinal direction.

In the accompanying drawing wherein I have illustrated a preferred embodiment of my invention, Figure 1 is a longitudinal sectional view of the rotor element of an elastic fluid turbine; Fig. 2 is a sectional view of one of the wheels; Fig. 3 is a side view of the ring which is shown surrounding the shaft at approximately the center of Fig. 1; Fig. 4 is a side view of one of the wheels, and Fig. 5 is an enlarged perspective thereof.

Referring to the drawing, 6 indicates the shaft of a rotor upon which are mounted the hubs 7 carrying the web members 8 which go to make up each rotor wheel. The wheels may be mounted on the shaft in any approved manner, but I prefer to mount them as shown in the drawing, wherein the hubs are counterbored to form rabbets or grooves 9 on each side which fit over the rings 10. These rings make a driving fit with the shaft and the hubs make a driving fit with the rings. The fit between the adjacent surfaces of the shaft and hub need not be tight and exact. In other words, the wheels are fitted to and carried by the rings 10. The wheels and rings are keyed to the shaft as indicated at 11, the key-ways in the wheels being shown at 12 in Figs. 4 and 5.

Each hub has one face formed smooth as indicated at 13 (Fig. 2), and the other face formed with circumferentially spaced projections 14, three being shown in the present instance. The arrangement of these projections is best shown in Fig. 5, wherein the same are shown exaggerated in size for the sake of clearer illustration. The projections are shown as being spaced approximately 120 degrees apart. In assembling the wheels are arranged with the projections of one hub resting against the smooth face of the adjacent hub, and with the projections of adjacent hubs staggered with relation to each other. That is, the first wheel, as shown to the right in Fig. 1, will be assembled with its smooth face against the ring 15, the next wheel will then be placed with its smooth face against the projections on the hub of the first wheel and with its projections circumferentially displaced from those of the first by about 60 degrees. The successive wheels will then be assembled in like manner.

At two points adjacent wheels are shown as being spaced apart axially by greater distance than at the remaining points, and for this purpose suitable spacing rings as shown at 16 and 17 may be used. The spacing ring 17 is formed after the same manner as are the hubs, as will be seen from the drawing particularly Fig. 3, where this spacing ring is shown by itself. The spacing ring 16 is illustrated as being smooth on both faces, although it will be understood that it could be formed with projections if found desirable.

The projections 14 amount in substance to spacing pieces which space apart the adjacent hubs at angularly displaced points, and although the same are shown in the present instance as being formed integral with the hubs and on one side only of each hub, it is obvious that other specific arrangements may be used. It is clear that I need not necessarily provide spacing members between all the hubs but may provide only so many as may be found desirable.

When with the above described arrangement unequal expansion of the hubs relative to the shaft occurs, it will be clear that the hubs may yield slightly, thus permitting of the expansion and avoiding the excessive strains which would otherwise result.

Although I have described my invention as used in connection with a turbine rotor, it will, of course, be understood that it is not necessarily so limited, but that it is applicable to other machines wherein a similar condition of unequal heating might occur.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. The combination in an elastic fluid turbine, of a rotor comprising a shaft, wheels mounted thereon, and spacing members arranged between two or more of the wheels, said members being circumferentially spaced apart with the members on one side of each wheel staggered with relation to those on the other.

2. The combination in an elastic fluid turbine, of a rotor comprising a shaft, and wheels mounted thereon which are provided on their hubs with projections for spacing apart adjacent hubs, said projections being spaced circumferentially and those on opposite sides of any wheel being staggered relative to each other.

3. In a machine wherein the rotor may be subjected to temperatures causing unequal expansion, the combination of a shaft, spaced rings on the shaft, running wheels having their hubs provided with recesses which fit to said rings, and spacing members arranged between the wheels, said members being circumferentially spaced apart with the members on one side of each wheel staggered with relation to those on the other.

4. The combination in an elastic fluid turbine, of a rotor comprising a shaft, spaced rings on the shaft, and running wheels having their hubs provided with recesses which fit to said rings, two or more of said hubs being provided with integral spaced projections which serve to space apart adjacent hubs, the projections on one side of any hub being out of axial alinement with those on the other side.

In witness whereof, I have hereunto set my hand this ninth day of June, 1914.

WALTER KIESER.

Witnesses:
 WILBY NEWMANN,
 ERNST HELLER.